United States Patent Office 2,760,599
Patented Aug. 28, 1956

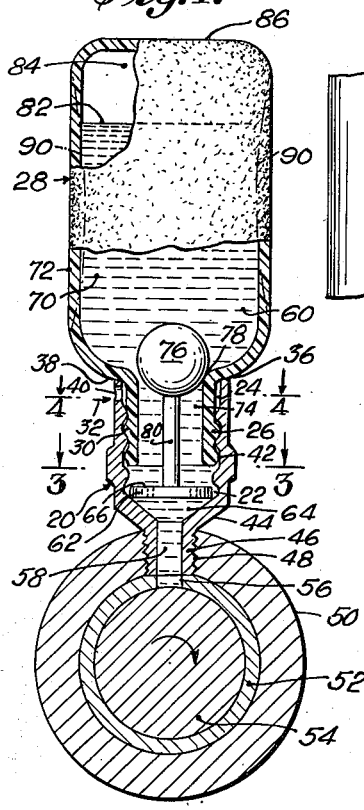

2,760,599
LUBRICANT FEED AND LUBRICATING DEVICE

Stuart O. Sunden, Noroton Heights, Conn., assignor of forty per cent to Peter Fries, Jr., New York, N. Y.

Application February 8, 1951, Serial No. 210,056

3 Claims. (Cl. 184—103)

This invention relates to lubricant feeding and lubricating devices.

An object of the invention is to provide a novel and improved lubricant feeding device whereby the lubricant within a device to be lubricated may be maintained automatically at a predetermined level.

Another object of the invention is to provide a novel and improved lubricant feeding device in which lubricant storage means is provided from which, upon connection of the device with a mechanism to be lubricated, the lubricant may be conducted to the mechanism according to a predetermined pattern, and automatically if desired.

A further object of the invention is to provide a novel and improved lubricant feeding device in which a housing is equipped with a refillable removable lubricant storage means, with novel valve means so constructed that a completely filled housing may be conveniently replaced in inverted position without the danger of spilling thereof.

Still another object of the invention is to provide a novel and improved lubricant feeding and lubricating device, in which the lubricant storage housing is compressible readily and with little external pressure, so that a starting or priming lubricant impulse may be given by the device, for any desired purpose.

Still a further object of the invention is to provide a novel and improved lubricant feed and lubricating device which includes construction features for regulating and controlling to a fine degree, the mode, pattern, and type of lubricant flow and rate of lubricant feed to a device to be lubricated, and which permits, if desired, the feed of lubricant by droplet lubrication.

Another object of the invention is to provide a novel lubricant feed and lubricating device of the character described, which is simple in design, inexpensive to manufacture, interchangeable with lubricating devices of existing machinery without extensive or material alteration of the machinery, to give vastly improved lubrication thereof, automatically and without the need for constant supervision.

These and other objects and advantages of the invention will become apparent from the following description of a preferred embodiment thereof as illustrated in the accompanying drawings, forming a part hereof, and in which, Figure 1 is a sectional elevation taken through my lubricant feeding and lubricating device, the device being shown mounted in lubricating position in engagement with a bearing to be lubricated thereby.

Figure 2 is a partly sectioned elevational view of the device shown in Figure 1, apart from the bearing, the various parts being shown in exploded positions, the middle element in perspective, and the ball valve in the process of transit or insertion inside the squeezable reservoir housing.

Figure 3 is a sectional plan view taken on plane 3—3 of Figure 1.

Figure 4 is a sectional plan view taken on plane 4—4 of Figure 1, the bearing being omitted from the view.

Figure 5 is an elevational view similar to that of Figure 1, but showing a modified form of the invention.

Figure 6 is a perspective view of a machine with two of my improved lubricating devices installed on the main bearings thereof for lubrication.

Figure 7 is a fragmentary elevational view showing my lubricating device supported by a machine and arranged for multiple lubrication.

Figure 8 is a fragmentary elevational view showing my lubricating device arranged for maintaining constant level of lubricant in a machine.

In the lubrication of machinery and machine parts, it is important that the lubricant be delivered to the part requiring lubrication in just the right amount and at the right time. Where a machine has been standing idle for some time, it is also important to lubricate the same before setting it in motion, otherwise considerable wear may result due to the friction encountered. Some machines may have differential lubrication requirements, as, for example, where some parts are constantly moving at high speeds, while others are moving intermittently, and/or at low speeds, and by means of the invention it is possible to take care of such differing lubrication needs without undue multiplication of lubrication mechanism, and at low cost. In addition, impulse lubrication at any one or more selected locations on the machine may also be provided for by simple means.

In order to understand clearly the nature of the invention, and the best means for carrying it out, reference may now be had to the drawings, in which like numerals denote similar parts throughout the several views.

This application is a continuation-in-part of my co-pending patent applications: Serial Number 78,943, filed March 1, 1949, for Lubricating Systems and Devices, now abandoned; Serial Number 186,893, filed September 26, 1950, for Lubricating Systems and Devices and Methods of Making Same; and Serial Number 189,544, filed October 11, 1950, for Pump, Lubricating Device and Flow Regulator, now Patent Number 2,705,458, issued April 15, 1955.

As shown in the drawings, there is a main housing 20 having a chamber 22 formed therein. The chamber 22 may be cylindrical or other convenient shape, and is adapted for engagement of its interior surface 24 with the neck 26 of the lubricant storage housing or reservoir 28. To facilitate this engagement, the interior cylindrical surface of the chamber 22, may be threaded along a portion thereof, as shown at 30, with smoothly rounded threads, as seen best in Figures 1 and 3, up to location 32 substantially, and similarly rounded threads 34 may be formed on the outer surface of the neck of the bottle 28, as shown best in Figures 1 and 2. From Figure 1 it will be seen that the fit of the threads 34 on the bottle neck 26 is relatively loose when in engagement with the inside threads 30 of the main housing, to allow leakage of air between these threads.

However, it is seen from Figure 1 that the upper edge 36 of the main housing is brought into close sealing fitting engagement against the rounded shoulder portion 38 of the lubricant housing 28, so as to block air leakage therepast. Where the lubricant housing 28 is formed of relatively soft plastic material, such as polyethylene plastic, it is possible quite easily to form an air tight seal by merely screwing the lubricant bottle 28 down firmly into contact of its shoulder 38 with the upper edge 36 of the main housing 20. One or more air inlet openings 40 are formed through the upper portion of the side wall of the main housing 20, allowing air from outside the housing 20 to leak into the space between the interior surface 24 of the main housing 20, and the outer surface of the neck 26 of the bottle or lubricant housing reservoir 28, when conditions permit such entry of outside air as will be described below.

It is seen from Figure 1 that the lower end or mouth 42 of the bottle neck 26 need not extend downwardly further than shown, and is preferably no lower substantially than illustrated. The lower portion of the main housing 20 is frusto-conical as shown at 44, and merges with the housing outlet neck 46 which is somewhat reduced as needed and threaded externally for engagement with the threaded radial bore or opening 48 in the part 50 to be lubricated thereby. As illustrated, the part 50 may be a bearing having a sleeve or lining 52 containing a rotatable shaft 54, and as seen the sleeve 52 has a radial opening 56 communicating between the rotatable shaft 54 and the bore extension 58 so that lubricant 60 which enters the feed chamber 22 of the main housing, may reach the shaft 54 therethrough.

A flow regulator disk 62 is disposed as shown, in the interior of main housing chamber 22, and is of sufficient outside diameter as to rest upon the upper portion of the frusto-conical vestibule chamber 64. Holes 66 penetrate the disk 62 in a vertical direction as seen best in Figures 1 and 2, and in plan in Figures 3 and 4, so as to allow lubricant to pass therethrough in a downward direction. Although only two such holes 66 are illustrated, it will be understood that more than two may be employed, and also that their locations and arrangement may be changed as well as their relative size. Thus, by adjusting their size and diameters, the rate of flow therethrough may be controlled for lubricants of various viscosities.

Inside the lubricant reservoir housing 28 there is a lubricant storage chamber 70 containing the lubricant 60. The lubricant reservoir housing 28 may be conveniently cylindrical in the contour of its main outer walls 72, merging smoothly at shoulder 38 with the cylindrical neck 26. A bore or passageway 74 forms the outlet from the lubricant storage chamber 70, and as shown, a valve ball 76 is disposed inside the chamber 70 as seen best in Figure 1, so as to rest normally upon the sides of the upper end 78 of the bore 74, sealing this opening, and normally blocking passage of lubricant from the chamber 70 when thus seated in blocking or sealing position as indicated at 76 in Figure 2.

A lifting post 80 is carried by or integral with the disc 62, extending upwards from the central portion thereof preferably, so that once the reservoir housing 28, filled with lubricant 60 has been moved into the position inverted as seen in Figure 1, and then screwed down in engagement with housing 20, the lifting post 80 exerts lifting force from below upon the valve ball 76, lifting it off its seat 78, and allowing lubricant in chamber 70 free access to the neck bore 74 of the lubricant housing 28. The lifting post 80 is so proportioned as to lift the sphere 76 off its seat only when the parts are in the relative positions shown substantially in Figure 1. The ball 76 itself is easily forced under pressure upwards into the bottle 28 in the manner shown in Figure 2, through the relatively soft neck 26 of the plastic bottle, being shown at 76a as it is being pushed through the neck, the diameter of the valve ball 76 being somewhat greater than the inside diameter of the bottle neck 26. By this means, it is simple to invert the bottle 28 while filled with lubricant fluid without spilling it.

Once the bottle 28 has been inverted and screwed into the housing as shown in Figure 1, the lubricant 60 will drop to some level 82 inside the chamber 70, leaving a hollow unfilled space 84 between the upper level 82 of the lubricant and the closed top wall 86 of the bottle 28. To fill this vacuum space 84, outside air will flow through the opening 40 in the wall of the main housing 20, leak down between the loosely fitting threads on the interior of the main housing 20 and the exterior of the bottle neck 26, and thence past the lower edge 42 of the bottle neck and upwards through the lubricant 60, and into the air space 84 above the lubricant, allowing lubricant 60 to move downwards to fill the rest of the interior of the main housing 20 and the connecting bore 48, so as to come into lubricating contact with the shaft 54 to be lubricated.

It will be observed that the lubricant feed is automatic, that is to say, as lubricant is consumed by the bearing 50 and its shaft 54, air will leak into the hole 40 and thence into the air space 84 above the lubricant upper level 82, allowing lubricant from the reservoir 70 to move downwards past ball 76 and downwards towards the bearing 50 for use. Each increment of lubricant consumed by the bearing will cause a corresponding influx of air into air space 84 and a corresponding release of lubricant 60 from the reservoir 70 for use by the bearing 50. It is noted that the action will be automatic, and that no intervention is needed at all for automatic feed to the bearing as lubricant is consumed. When all the lubricant in reservoir 70 is consumed, then it is simple to unscrew the bottle 28, and refill it, and then replace it as before. The level 82 may be ascertained by inspection since the walls of the bottle 28 are transparent or translucent, being made preferably of soft squeezable or compressible plastic material, such, for example, as polyethylene plastic, which can easily be squeezed between the fingers as shown in Figure 6, from normally full position or expanded position shown in full lines in Figures 1 and 2, to squeezed position shown in broken lines at 90 in Figure 1.

By squeezing the oil bottle 28 with the hands as shown in Figure 6, an initial lubricating impulse may be given to the lubricant 60 so that it will freely lubricate the bearing shaft 54 before the shaft is placed in motion. This will result in minimizing the friction, especially when the shaft 54 has been standing idle for any time, allowing a thin film of lubricant to enter the space between the shaft 54 and the bearing sleeve 52 at or prior to this initially critical period in lubrication.

Referring now to Figure 5, it is seen that the construction of the device shown therein is similar to that of Figure 1, except that a porous flow regulator plug 92 is disposed inside the bore 58 of the neck 46 of the main housing 20. The porous flow regulator plug 92 may be of any suitable type, such will allow lubricant fluid to pass therethrough according to any predetermined flow rate pattern. Such a porous plug 92 may be made of any suitable materials as disclosed in my pending patent applications Serial Number 78,943, filed March 1, 1949, for Lubricating Systems and Devices, or Serial Number 186,893, filed September 26, 1950, for Lubricating Systems and Devices and Methods of Making Same.

The porous plug 92 is disposed in the neck bore 58 substantially spaced from the shaft 54 which the device is to lubricate, and by this means, and the plug 92, droplet lubrication, as described and illustrated in detail in said patent applications Serial Numbers 78,943, and 186,893, will be accomplished, with its many advantages, where desired. The illustration in Figure 6 shows any form of machine or mechanism 100 in a suitable housing, and driven by rotatable shaft 54, supported in bearings 50 at each end of the housing 100, which in turn is supported upon legs 102. Since there are two bearings 50 shown, there will normally be two lubricating housings 20 and each will have its own squeezable lubricant reservoir or bottle 28. Initial lubricating impulses may, if desired, be given at each bearing 50 by merely squeezing as shown in the right hand portion of Figure 6, the squeezable reservoir 28.

Where initial lubricating impulses are to be provided by squeezing the soft lubricant reservoir 28, it is preferable to use one finger to cover the air inlet opening 40 while this housing 28 is being squeezed, thus blocking exit of any lubricant through the hole 40 at this time.

As shown in Figure 7, a single lubricating device may be employed to feed lubricant to more than one part of the machine requiring lubrication. Thus, a bracket rod 110 may be threaded at one end into a hole bored in a boss 112 in a wall 114 of a machine or the like, the other end of the rod 110 being threaded into the neck 116 of a T-coupling 118. The lubricating main housing 20 is threaded at its lower end into the upper inlet 120 of the T-pipe coupling 118, so as to feed lubricant into the coupling 118 from the squeezable lubricant reservoir 28. A delivery pipe 122 carries lubricant fluid 60 from housing 20 to branch pipes 124 and 126 which in turn convey the same to bearings or other parts, requiring lubrication, of a machine.

Figure 8 shows how the same lubricating device is employed to regulate the flow of lubricant to a housing or other portion of a machine 130 to maintain the lubricant level 132 as predetermined, inside the housing 130. For example, the housing 130 may be a gear box inside which it is important to maintain the lubricant at the level 132 at all times. For this purpose, I provide an L coupling 134 communicating with the interior of the gear box 130. The lubricating device housing 20 is threaded into the upper end of the L coupling 134 so as to feed lubricant thereto and into the gear box. The squeezable reservoir 28 is filled with lubricant as seen in Figure 1, and will maintain the lubricant level 132 inside the gear box, at all times, automatically, this corresponding to the level of plane 3—3 in Figure 1.

As lubricant inside the gear box 130 is used up, and the oil level inside box 130 drops, air will leak into the bottle 28 through hole 40, allowing oil 60 to leave chamber 70 and enter the gear box 130, maintaining its level.

Although I have described my invention in specific terms, it will be understood that various changes may be made in size, shape, materials and arrangement without departing from the spirit and scope of the invention as claimed. It will also be understood that the bottle 28 may be made of other materials having the same general squeezable characteristics. Where desired, and where it is not necessary that the initial lubrication impulse described be furnished by squeezing, then bottles 28 having other characteristics, and not necessarily squeezable may be employed, the squeezable bottle being however the preferred form of the inventive embodiment. As shown in Figure 6, it is preferable to use one finger to cover the opening 40 when squeezing the flexible bottle 28, thus preventing any leakage of lubricant out of the housing therethrough at the moment of squeezing, after which the finger may be removed from hole covering position.

I claim:

1. A lubricating device comprising a main housing having a discharge outlet, and a chamber formed therein to receive lubricant, a reservoir housing formed of flexible material engaging said main housing and having a reservoir chamber communicating with the said main housing chamber for conducting lubricant thereto, lubricant in said reservoir housing chamber, and automatic air inflow means comprising a loose thread coupling between said main and reservoir housings for regulating the flow of lubricant from said reservoir chamber into said main housing chamber, upon discharge of lubricant from said discharge outlet, and wherein said flexible material forming said reservoir housing is squeezable flexible polyethylene plastic material, whereby, upon external squeezing pressure exerted from outside upon the side walls of said housing, the lubricant therein is pressurized.

2. The construction according to claim 1, wherein said main housing chamber is open on its lubricant inlet end, and threaded, and wherein said reservoir chamber is open on its outlet end and threaded for engagement with the threaded inlet end of said main housing, there being a loose fit between said threaded portions of said main housing and reservoir chamber, sufficient to allow leakage therebetween, and wherein the upper end of said threaded main housing inlet end is brought into tight sealing engagement with said reservoir housing to block air passage therebetween, and wherein said main housing inlet has an air intake opening formed therethrough, through which air is free to leak into said space between said threads and thence into said main housing chamber and up into said reservoir chamber upon discharge of lubricant from the discharge end of said main housing, whereby the lubricant in said main housing chamber is maintained automatically at a predetermined level.

3. The construction according to claim 1, wherein a valve seat is formed in said reservoir chamber, a valve ball disposed in said reservoir chamber for being seated on said valve seat to normally block egress of lubricant from said reservoir chamber when in inverted position, and post means disposed in said main housing chamber and extending into said reservoir housing, and so constructed and arranged that when said reservoir housing is brought into communicating engagement with said main housing chamber, said post means elevates said valve ball member off said valve seat so as to unblock the same.

References Cited in the file of this patent
UNITED STATES PATENTS

| | | |
|---|---|---|
| 235,162 | MacDonald | Dec. 7, 1880 |
| 832,875 | O'Connor | Oct. 9, 1906 |
| 1,362,777 | Carson | Dec. 21, 1920 |
| 1,548,221 | Spreen | Aug. 4, 1925 |
| 1,548,222 | Spreen | Aug. 4, 1925 |
| 2,054,070 | Covyeow | Sept. 15, 1936 |
| 2,095,598 | Everett | Oct. 12, 1937 |
| 2,588,026 | Martin | Mar. 4, 1952 |

OTHER REFERENCES

Product Engineering, page 142p, March 1942.